United States Patent [19]

Delande et al.

[11] Patent Number: 5,620,721
[45] Date of Patent: Apr. 15, 1997

[54] ASSEMBLY FOR PREPARING MOLDED ARTICLES

[75] Inventors: Bruno Delande, Marseille en Beauvaisis; Claude G. Liegaux, Beauvaisis, both of France

[73] Assignee: Nestec S.A., Vevey, Switzerland

[21] Appl. No.: 347,866

[22] Filed: Dec. 1, 1994

[30] Foreign Application Priority Data

Dec. 21, 1993 [EP] European Pat. Off. .............. 93120603

[51] Int. Cl.$^6$ ..................................................... H23G 9/26
[52] U.S. Cl. ........................... 425/443; 425/186; 426/515
[58] Field of Search ................................. 425/185, 186, 425/441, 443; 62/345; 426/389, 515

[56] References Cited

U.S. PATENT DOCUMENTS

| | | |
|---|---|---|
| 3,031,978 | 5/1962 | Rasmusson . |
| 4,318,563 | 3/1982 | Fowler . |
| 4,352,830 | 10/1982 | Billett et al. ........................ 426/515 X |
| 4,396,367 | 8/1983 | Gram . |
| 4,425,089 | 1/1984 | Billett et al. . |
| 4,507,070 | 3/1985 | Armstrong et al. . |
| 4,546,615 | 10/1985 | Gram . |
| 5,343,710 | 9/1994 | Cathenaut et al. . |

OTHER PUBLICATIONS

Cathenaut, European Patent Application No. 93105076.9, filed Mar. 27, 1993.

Primary Examiner—Robert J. Warden
Assistant Examiner—E. Leigh Dawson
Attorney, Agent, or Firm—Vogt & O'Donnell, LLP

[57] ABSTRACT

An assembly for preparing molded articles has opposing clamp members of a jaw suitable for gripping and releasing a component of a molding assembly. The clamp members are connected with and extend from a frame, and the frame positions members which are reciprocatively compressible and expandable for contacting and bearing upon the component and so that upon release of the clamp members from the component, the component is pushed.

16 Claims, 5 Drawing Sheets

ASSEMBLY FOR PREPARING MOLDED ARTICLES

BACKGROUND OF THE INVENTION

The invention concerns a device for transferring a component of a moulding assembly during an operation for moulding small articles, making possible the vertical picking up and replacing of a first mechanical piece, a countermould, complementary to and separable from a second mechanical piece containing the first piece, a main mould, the said pieces constituting a moulding assembly.

During the moulding of small articles, notably of frozen confectionary, with or without a stick, described as being "non-strippable", because, for example, they have a convex part, it is necessary to separate or remove the different parts of the moulding assembly in order to strip the articles from the mould.

European patent application No 93105076.9 refers to a process, a machine and an assembly for moulding small articles of frozen confectionary of the type indicated above, in which the system for transporting the moulding components comprises main moulds fixed to a plate constituting the rows of main moulds, the said plate being articulated on a first endless chain, independent countermoulds, extraction grippers fixed to a bar articulated on a second endless chain and a bar associated with the countermoulds, the function of which is to guide the countermoulds to a washing station.

Such a machine therefore enables the countermould to be picked up for the stripping of the articles from the mould, the countermould to be replaced in the main mould, and the moulding assembly to be guided to the washing station.

The plates of moulds in industrial use eventually exhibit a fatigue state characterised by a bending deformation consisting of a deflection which may measure several millimetres at their middle. The countermoulds, whose shape matches that of the main moulds, will then admit of a difference in level which may prevent, in the case of some of them, notably those which are placed in the middle or at the ends of the plate, from being correctly grasped by the grippers and from being replaced in the correct position in the main moulds.

SUMMARY OF THE INVENTION

The aim of the invention is to remedy the above-mentioned faults. Thus, the device must ensure reliable extraction from the countermould, a rapid and precise replacing of the countermould in the main mould and stable retention of it in position in the main mould without play or vibration.

The object of the present invention is therefore an improved transfer device fulfilling the same function, able to be used in the above process, but in the context of production at greater speed, when a large number of assemblies of main moulds and countermoulds are assembled in successive rows to form a transportation system in an in-line freezing machine at high speed and with high reliability.

The device according to the invention comprises means for gripping a component of a moulding assembly and means for locking and for ejecting the component in and from the gripper means. In an in-line system such as in the above-noted process, fixed means, described below as runners or rails, are provided for guiding a countermould to a washing station at a distance from the main molds. More particularly, the present invention provides a device which has jaw means comprised of two opposing clamp members suitable for gripping and releasing a component of a moulding assembly, which has a frame connected to the jaw means for supporting the jaw means so that the jaw means extend therefrom, and which has compressible and expandable reciprocative means positioned means of by the frame for reciprocating at a position between the clamp members so that upon positioning and gripping of the component between the clamp members, the reciprocative means contacts and bears upon the component and so that upon release of the clamp members from the component, the reciprocative means expands to push the component.

DESCRIPTION OF THE PREFERRED EMBODIMENTS

In the disclosure below, the component gripped is described with reference to a countermould having a stud extending therefrom, and as also referred to, the gripper may also be employed for gripping such as a stick of a lolly.

The gripping means comprise a bar, the substantially vertical flat inner face of which constitutes the fixed clamp of a gripper, a flat jaw constituting the pivoting clamp of the said gripper, articulated on a counter-bar about a horizontal shaft passing through the said counter-bar, the bar and counter-bar defining clear spaces between the struts connecting them, an angled lever fixed to the jaw and equipped with a return spring to hold the jaw against the fixed clamp in the extraction position, the lever acting against the return spring to open the gripper in the removal position.

The locking means includes a rigid frame fixed to the bar, supporting vertical pushers on compression springs, serving as stops against the top end of the countermould studs, the pushers cooperating with notches on the studs and with the jaw to hold the countermould without any degrees of freedom both vertically and horizontally.

The studs are provided with at least one flat vertical part, at least one sliding slope part and at least one stopping counter-slope part, the slope and counter-slope part defining a profiled notch which cooperates with the jaw in order to press the countermould against the inner face of the bar.

The means for ejecting the countermoulds rapidly when they are removed during the opening of the gripper result from the combined effects of the disengagement of the jaw from the notches and from the expansion of the compression springs acting on the studs stops, which has the consequence of driving the studs downwards.

The invention will be better understood by means of the following detailed description given with respect to the accompanying drawings illustrating an embodiment of the invention provided by way of example.

DETAILED DESCRIPTION OF THE DRAWINGS

Figure 1:
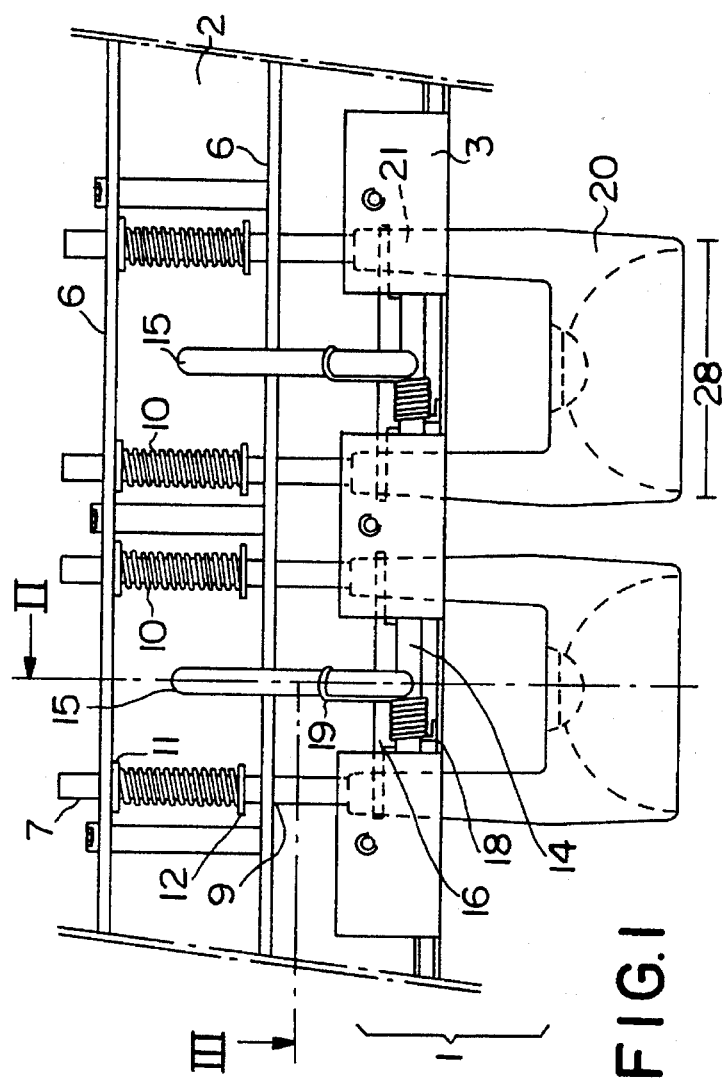
FIGS. 1, 2 and 3 are a partial front view, a view in cross section along line II and a plan view of a cross section along line III of an extraction gripper with the countermoulds.
Figure 3:
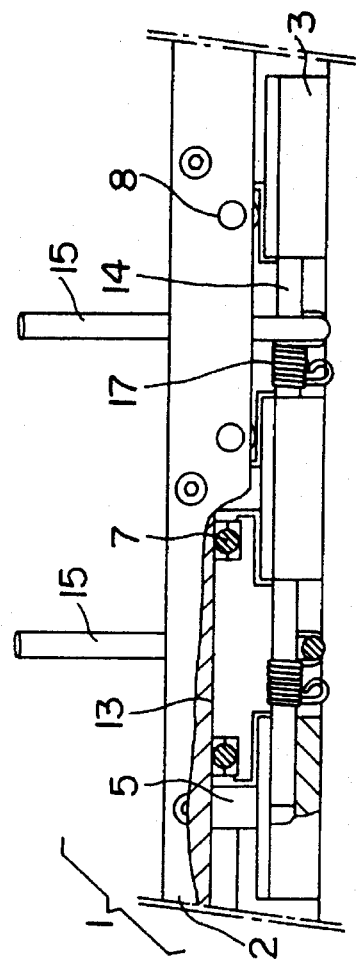
Figure 2:
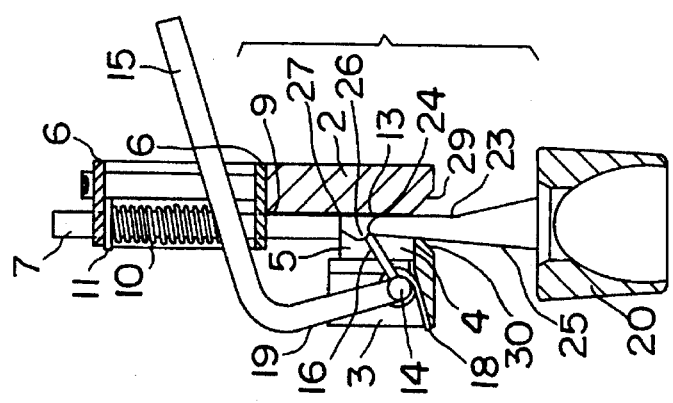

In FIGS. 1 to 3, an extraction gripper 1 comprises a bar 2 and a counterbar 3 which are parallel, separated by clear spaces 4 and connected together by struts 5. On the top part of the bar 2, a frame 6 is fixed, the function of which is to give rigidity to the bar 2 and which serves to support pushers 7 in the form of rods, guided vertically in orifices 8 and 9 in the frame 6. The pushers 7 are provided with compression springs 10 positioned coaxially about the rod between the washer 11 and the collar 12 fixed to the rods. The inner face 13 of the bar 2 forms the fixed clamp of the gripper.

The counter-bar 3 has passing through it from end to end a horizontal shaft 14 to which angled levers 15 are fixed at right angles. A second clamp, jaw 16, also fixed to the shaft 14, pivots about the latter and is held pressed downwards by the helical return spring 17 which is wound about the shaft 14 and one end 18 of which presses against the counter-bar 3 and the other end 19 of which bears on the lever 15. The jaw clamp 16 constitutes the moving clamp of the gripper.

The countermould 20 is provided with studs 21. The studs 21 are adapted to the extraction gripper for engagement by the gripper clamp(s) and, as illustrated, are provided with a flat vertical back 23, which serves as a bearing on the inner face 13 of the bar 2, and each has a notch 24, which is specially profiled by a slope part 25, for sliding, and a counter-slope part defining a protubera 26, for stopping, which converge to define the notch and cooperate with the jaw clamp 16. Thus, a cross section of the stud at the notch has a cross-sectional size less than a cross-sectional size of the remainder of the slope part 25. The studs 21 have a length suitable for being gripped by the clamps, and they end in a flat horizontal face 27 which comes to bear against the end of the pushers 7. In addition, the footprint 28 of the studs 21 is less than the maximum width of the jaw 16. A space 4 between the inner face 13 of the bar 2 and the shaft 14, for pivoting the gripper, is greater than the thickness of a stud 21 and sufficient to allow it to pass between the two clamps of the gripper. To this end, the bar 2 and counter-bar 3 have bevels 29 and 30 in their bottom part to guide the studs in the gripper.

Figure 4:
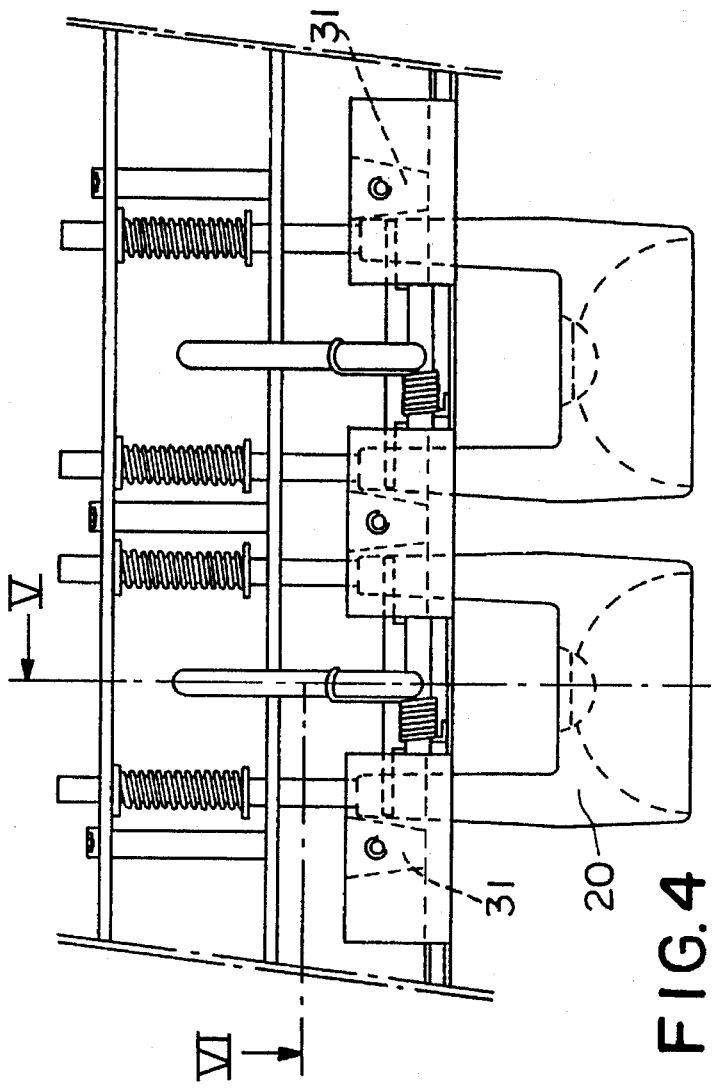
FIGS. 4, 5 and 6 are a partial front view, a view in cross section along line V and a plan view in cross section along line VI of a variant of an extraction gripper with the countermoulds.
Figure 6:
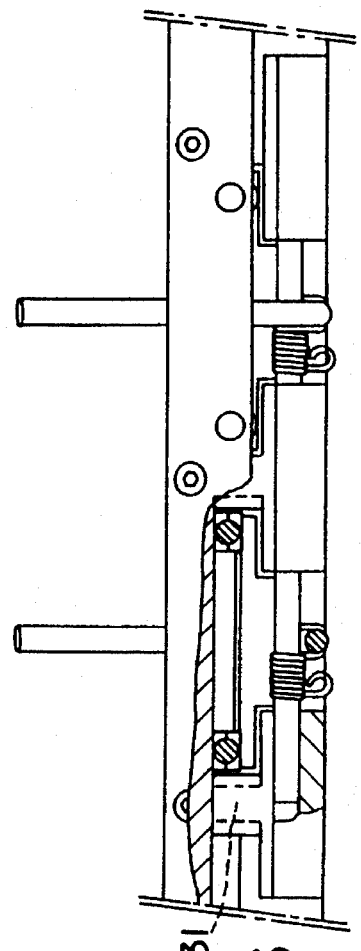
Figure 5:
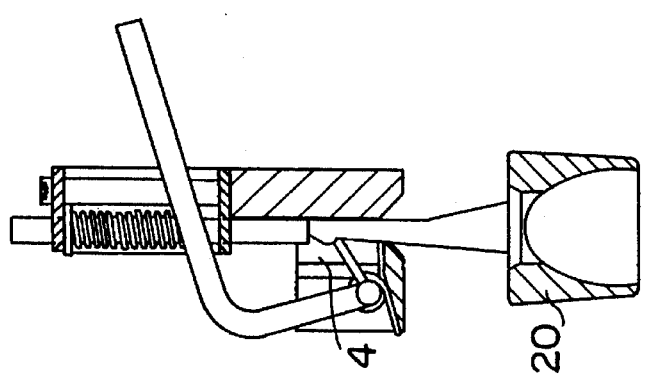

In the variant shown in FIGS. 4, 5 and 6, the struts 5 are replaced by dovetails 31 which have the double function of fixing the bar 2 to the counter-bar 3 and, as a result of their inverted conical form, to guide the countermould 20 laterally in the space 4.

Figure 7:
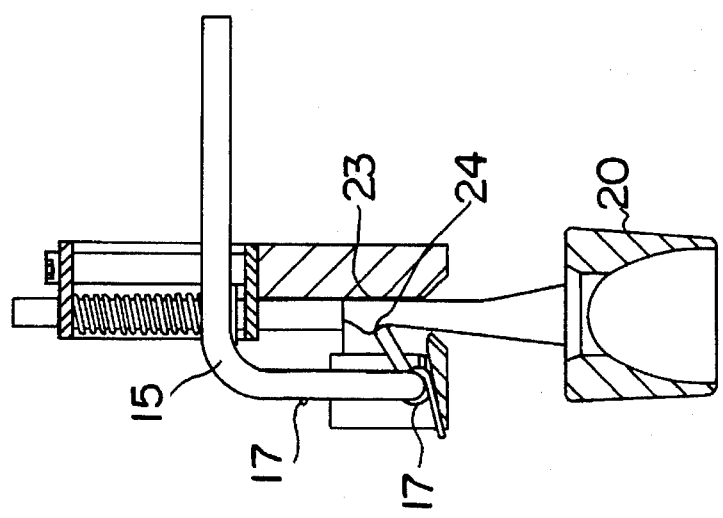
FIG. 7 is a cross section of a variant of the gripper.

In FIG. 7, the lever 15 has its horizontal arm in the extraction position instead of the latter being inclined (FIGS. 2 and 5).

Figure 9:
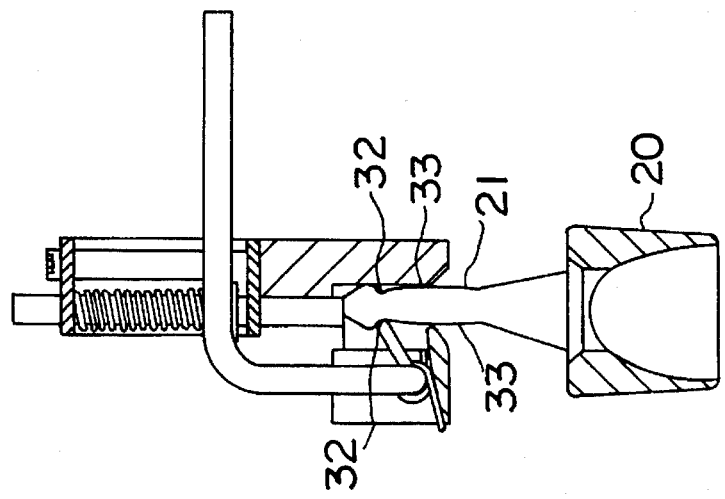
FIG. 9 shows, in cross section, a gripper with a variant of the countermould studs.

In the variant in FIG. 9, the studs 21 have indentations and protuberances which provide two notches 32 back to back and, in the lower part, two vertical bearing surfaces 33 which fulfill the same function as the notch 24 and the back 23, the sole difference being that, in this version, the countermoulds 20 may be positioned in either direction.

Figure 10:
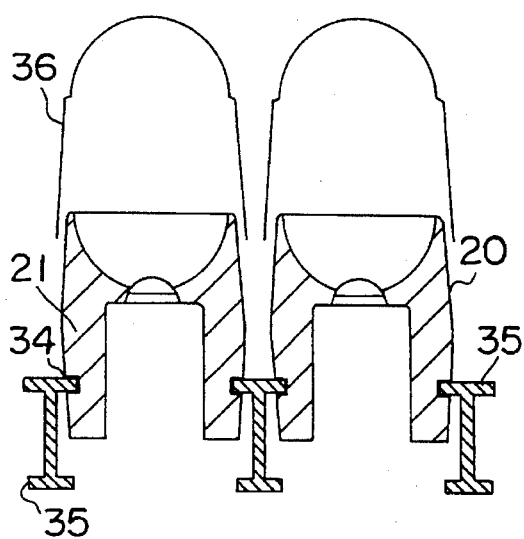
FIGS. 10, 11, 12 and 13 show, in cross section, means for guiding the main moulds and countermoulds on the return run of the chain.
Figure 11:
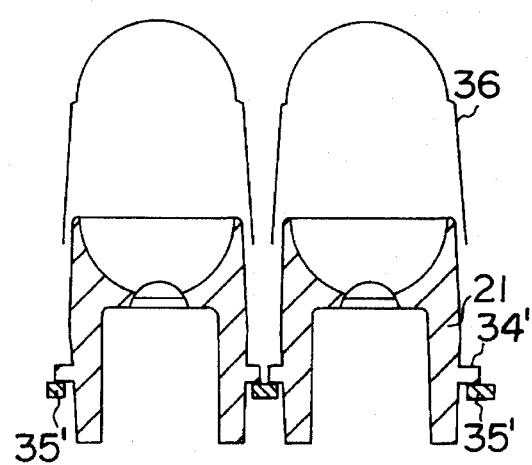
Figure 12:
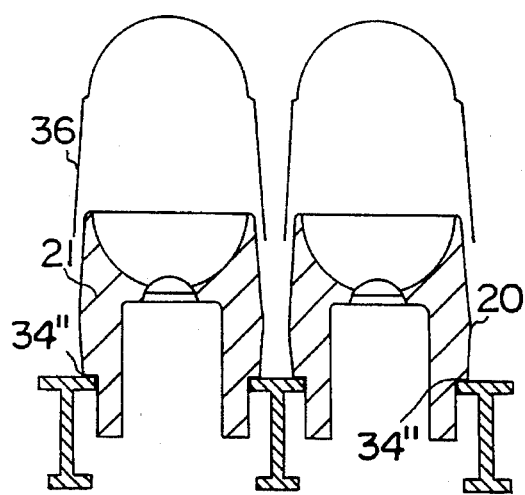

As shown in FIG. 10, the studs 21 each have a notch 34, turned outwards. The notches 34 have the function of supporting the countermould 20 in the inverted position when coming into contact with the fixed individual rails 35, which begin at the outside of the return curve of the chain run and accompany the countermould as far as the washing station (not shown). These rails 35 are profiled so as to hold the countermoulds 20 at a necessary distance from the main moulds 36. Thus the countermoulds 20 cannot be pushed back against the main mould 36, for example under the effect of the washing jets (not shown). The notches 34 may be replaced by snugs (34', FIG. 11) or by lateral shoulders (34", FIG. 12) on the studs, towards the outside. In the case of FIG. 11, the rails 35 are replaced by runners (35') adapted to the said snugs.

Figure 13:
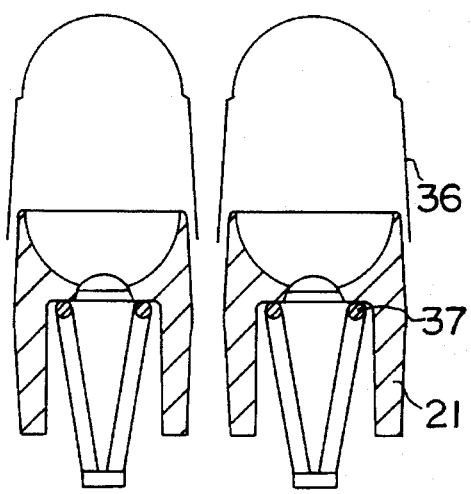

In the variant in FIG. 13, two spokes 37 with a solid round cross section support the countermould on the return run of the chain and guide it inside the studs which, in this case, have no notch, snug or shoulder.

Figure 8:
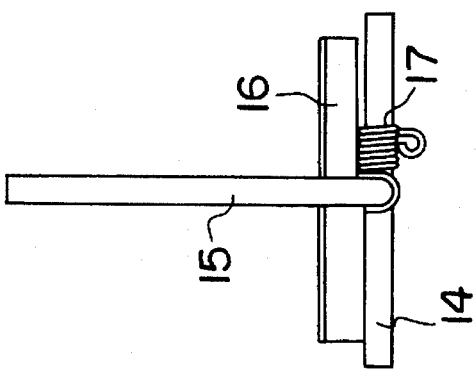
FIG. 8 is a representation of a jaw.
Figure 14:
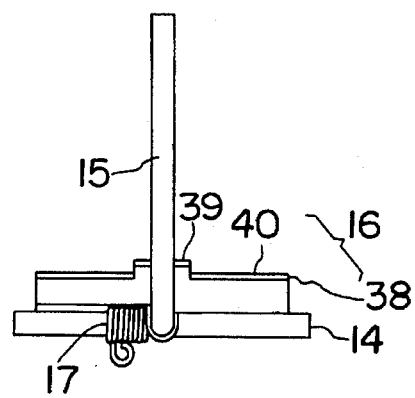
FIG. 14 shows a variant of a jaw.

In FIG. 14 the jaw has an edge 38, the central part 39 of which is wider than the sides 40, which are situated at the same level as the edge of the preceding jaw as shown in FIG. 8. Thus equipped, a gripper can grip either the studs of a countermould or the stick of a lolly, which has the advantage that the grippers do not need to be differentiated, the jaw being dual-purpose.

Figure 15:
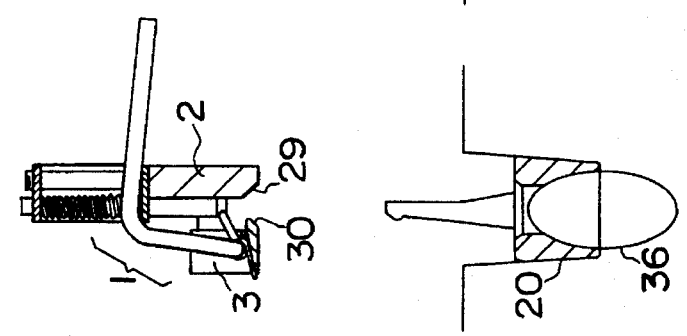

The device functions in the following manner:

In FIG. 15, an extraction gripper 1 descends. The slight offset in position which may exist between a main mould plate 36 on the first chain and a bar 2 on the second chain is compensated for by sufficient opening of the gripper. The bevelled edges (29, 30) of the inner faces of the bar and counter-bar ensure that the studs are inserted.

Figure 16:
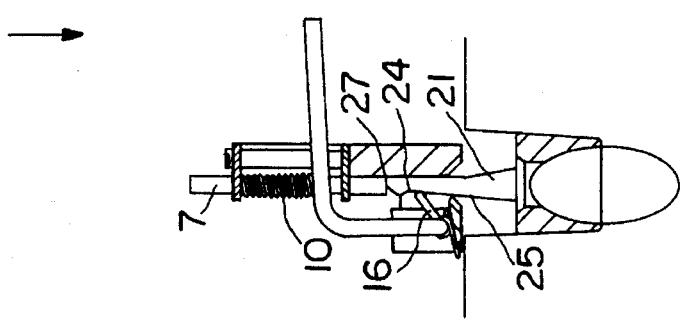

In FIG. 16, the jaw 16 of the gripper descends to a lower level than the top of the notch 24 but always remains situated somewhere in the slope 25 of the notch which serves as a sliding plane. The level reached varies according to the countermoulds, by their position with respect to the mould plate. The top face 27 of the studs 21 comes to bear against the bottom part of the pushers 7 and compresses the springs 10. The studs 21 are then snapped in.

Figure 17:
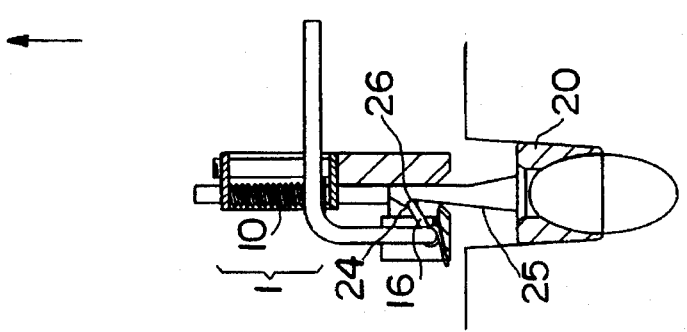

As shown in FIG. 17, the springs 10 expand during the ascent of the gripper 1 and thus push the countermould 20 downwards, because the jaw 16 slides on the slope 25 of the notch 24. It is locked at the stop level on the counter-slope 26 of the notch 24. The countermoulds 21 are thus repositioned so as to be perfectly horizontal.

Figure 18:
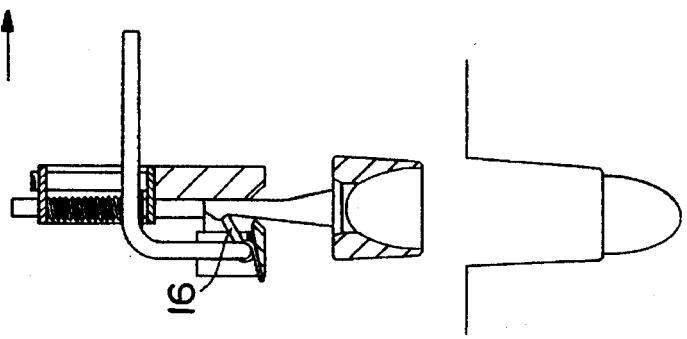

In FIG. 18, the studs 21, which are snapped in, hold the countermould 20 in place in a stable and precise manner. The latter is locked in four directions, upwards, downwards, forwards and backwards, under the action of the jaw 16, which can escape only upwards. Thus it cannot be placed crosswise when it is transferred and reinserted into the main mould 36.

Figure 19:
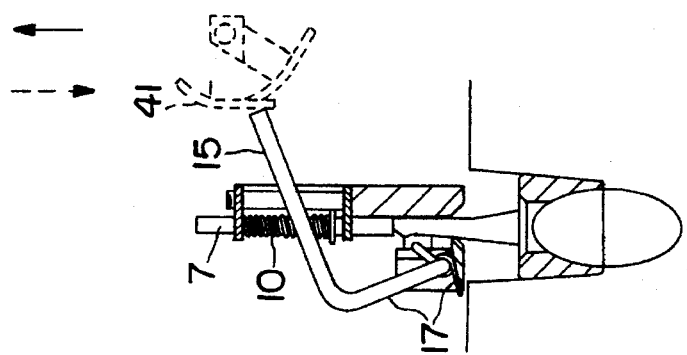
FIGS. 15, 16, 17, 18 and 19 show, in cross section, the sequences of extraction and replacing of the countermoulds.

In FIG. 19, the countermould is replaced in the main mould and then released. After the products have been extracted and the empty main moulds have been moved forward, the countermoulds must be lowered and replaced in the main moulds. In order to do this, the lever 15 comes to bear against the cam 41, which is movable and moved upwards in the operating position (the idle position of the cam 41 is shown in dotted lines). This cam may be replaced by a fixed inclined plane (not shown). The cam 41 causes the lever 15 to pivot anti-clockwise and to act against the return spring 17. The gripper then opens even before the raising and lowering device (not shown) which controls it is in the lowered position, which releases the countermoulds. By the action of the compression springs 10 of the pushers 7, the countermould is ejected from the gripper, which ensures rapid release, compatible with the high speed of the machine. This is because the time taken for the countermoulds to slide out of the grippers is then eliminated.

The raising and lowering device involved in the replacing of the countermould corresponds to C in European patent application No. 93105076.9. It is preferably controlled independently of the raising and lowering devices A and B in this same application in spite of being synchronised with them, in that its travel can be adjusted and is independent of that of the raising and lowering devices A and B.

In the preceding description an extraction gripper as shown in FIGS. 1 or 4 carries two countermoulds for reasons of simplification of the drawing. Of course, the explanations given remain valid for a machine having plates articulated on the first chain containing 4 to 12 moulds and corresponding grippers for 4 to 12 countermoulds articulated on the second chain. In the case of plates containing 12 moulds, for example, longitudinal safety bars can be provided limiting the deflection. The stiffening frame carrying the pushers may advantageously include struts at regular intervals to give the extraction bar good rigidity.

We claim:

1. An assembly for gripping and releasing articles comprising:

gripping and releasing means comprising two opposing jaw clamp members for gripping and releasing an article;

a frame connected to the gripping and releasing means for supporting the gripping and releasing means so that the jaw clamp members extend from the frame; and compressible reciprocative means supported by the frame at a position and configured so that upon positioning for gripping an article and when an article is gripped by the jaw clamp members, the reciprocative means contacts and bears upon the article and so that upon release of the grip, the reciprocative means pushes the article.

2. An assembly according to claim 1 wherein the reciprocative means comprises a rod which extends from the frame to a first rod end displaced a distance from the frame and comprises a compression spring positioned coaxially about the rod so that the rod is reciprocative for contacting, bearing upon and pushing an article.

3. An assembly according to claim 2 wherein the reciprocative means further comprises a collar affixed to the rod and wherein the frame comprises first and second spaced-apart members having orifices therethrough positioned so that the orifices are aligned for passage of the rod therethrough, and wherein the rod extends through the orifices, the collar is affixed to the rod at a position so that the first frame member is positioned between the collar and the first rod end and the collar has a size larger than a size of the first frame member orifice, and the spring is positioned between the collar and the second frame member so that upon movement of the rod and collar towards the second frame member, the spring is compressed.

4. An assembly according to claim 1 wherein a first of the jaw clamp members comprises a bar which is fixed to and extends from the frame and wherein the gripping and releasing means further comprises:

two spaced-apart strut members which are connected to and extend transversely for a distance from the bar jaw member;

a second bar member which is connected to and extends transversely from the strut members so that the second bar member opposes the bar jaw member at a position a distance from the bar jaw member;

a rotatable shaft which is supported by the second bar member so that the shaft extends axially at a position between the struts;

a lever fixed to the shaft for axially rotating the shaft;

a helical spring which is wound about the shaft and which extends between two protruding ends so that one end bears upon the lever; and wherein the shaft is positioned and wherein the second jaw clamp member extends transversely from the shaft at a position so that upon being pivoted by rotation of the shaft in a first direction, the second jaw clamp member is moved towards the first bar jaw member for, together with the first bar member, gripping an article and so that upon being pivoted by rotation of the shaft in a second direction, the second jaw member is moved away from a first bar member for releasing the article and wherein the second spring end is positioned so that when the second jaw member is moved towards the first bar jaw member for gripping, the second spring end presses against the second jaw clamp member.

5. An assembly according to claim 4 wherein the lever is angled.

6. An assembly according to claim 4 wherein the bar jaw member and the second bar member each comprise a beveled portion at a position for guiding an article to a position between the jaw clamp members for being gripped.

7. An assembly according to claim 1 wherein the jaw clamp members are configured for gripping a stick of a molded lolly article and the reciprocative means is configured to bear upon and push the stick.

8. An assembly for placing and picking up a mold piece in an assembly for preparing molded articles comprising:

gripping and releasing means comprising two opposing jaw clamp members for gripping and releasing a mold component;

a frame connected to the gripping and releasing means for supporting the gripping and releasing means so that the jaw clamp members extend from the frame;

a mold piece for preparing a molded article which comprises an interior article-molding component, an exterior mold piece component and a stud component which extends from the exterior component for a distance to a stud end and which is configured for being gripped by the jaw clamp members; and compressible reciprocative means supported by the frame at a position and configured so that upon positioning for gripping the stud and when the stud is gripped by the jaw clamp members, the reciprocative means contacts and bears upon the stud and so that upon release of the grip, the reciprocative means pushes the stud.

9. An assembly according to claim 8 wherein the reciprocative means comprises a rod which extends from the frame to a first rod end displaced a distance from the frame and comprises a compression spring positioned coaxially about the rod so that the rod is reciprocative for contacting, bearing upon and pushing the stud.

10. An assembly according to claim 9 wherein the reciprocative means further comprises a collar fixed to the rod and wherein the frame comprises first and second spaced-apart members having orifices therethrough positioned so that the orifices are aligned for passage of the rod therethrough, and wherein the rod extends through the orifices, the collar is affixed to the rod at a position so that the first frame member is positioned between the collar and the first rod end and the collar has a size larger than a size of the first frame member orifice, and the spring is positioned between the collar and the second frame member so that upon movement of the rod and collar towards the second frame member, the spring is compressed.

11. An assembly according to claim 8 or 10 wherein the stud comprises parts which are positioned between the exterior component and the stud end and define a notch and wherein one jaw clamp member comprises a clamp member portion profiled for engaging the notch for gripping the stud.

12. An assembly according to claim 11 wherein the stud parts comprise a flat-surface slope part and a counterslope part which converge to define the notch so that a cross-sectional size of the stud slope part is smallest at the convergence of the slope and counterslope parts and wherein the counterslope part defines a protuberance.

13. An assembly according to claim 12 wherein the stud further comprises additional parts which define a second notch positioned so that when the profiled jaw clamp member engages one notch, the other notch is positioned adjacent the other jaw clamp member.

14. An assembly according to claim 8 or 10 wherein the mold component comprises two spaced-apart stud components which extend from the exterior component and wherein the jaw clamp members are configured for gripping the two stud portions and the reciprocative means are positioned and configured for contacting, bearing upon and pushing the two stud portions.

15. An assembly according to claim 8 wherein a first of the jaw clamp members comprises a bar which is fixed to and extends from the frame and wherein the gripping and releasing means further comprises:

two spaced-apart strut members which are connected to and extend transversely for a distance from the bar jaw member;

a second bar member which is connected to the strut members and extends transversely from the strut members so that the second bar member opposes the bar jaw member at a position a distance from the bar jaw member;

a rotatable shaft which is supported by the second bar member so that the shaft extends axially at a position between the struts;

a lever fixed to the shaft for axially rotating the shaft;

a helical spring which is wound about the shaft and which extends between two protruding ends so that one end bears upon the lever; and wherein the shaft is positioned and wherein the second jaw clamp member extends transversely from the shaft at a position so that, for gripping a stud, upon being pivoted by rotation of the shaft in a first direction, the second jaw clamp member is moved towards the first bar jaw member for, together with the first bar member, gripping the stud and for, upon being pivoted by rotation of the shaft in a second direction, the second jaw member is moved away from a first bar member for releasing the stud and wherein the second spring end is positioned so that when the second jaw member is moved towards the first bar jaw member for gripping, the second spring end presses against the second jaw clamp member.

16. An assembly according to claim 15 wherein each bar member comprises a beveled portion at a position for guiding a component for guiding the stud to a position between the jaw clamp members for being gripped.

* * * * *